W. FETZER.
GRAIN DRILL.
APPLICATION FILED DEC. 1, 1908.
1,046,755.
Patented Dec. 10, 1912.
2 SHEETS—SHEET 1.
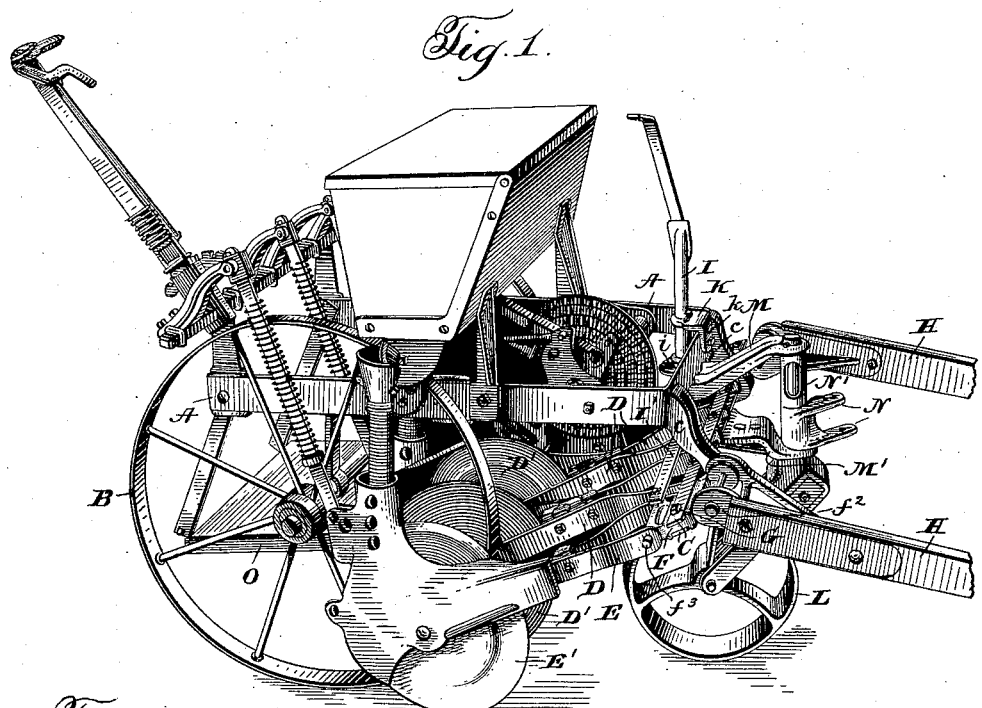
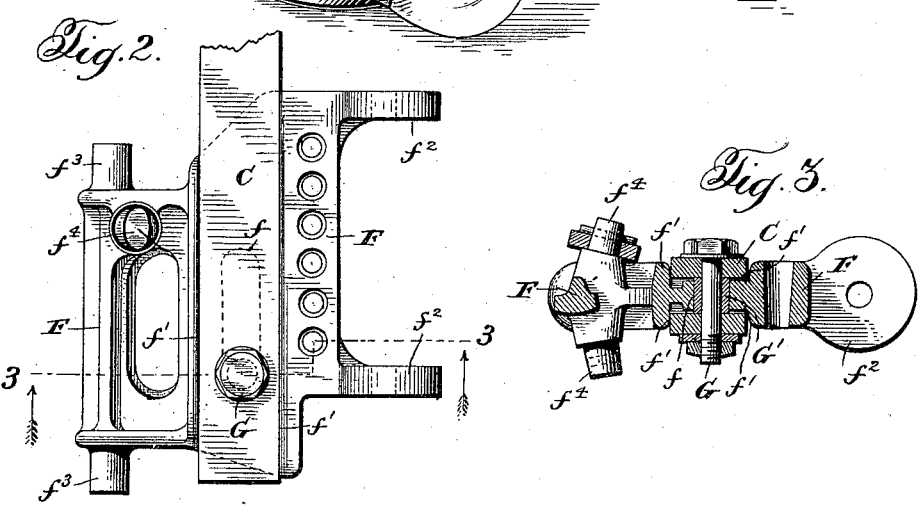

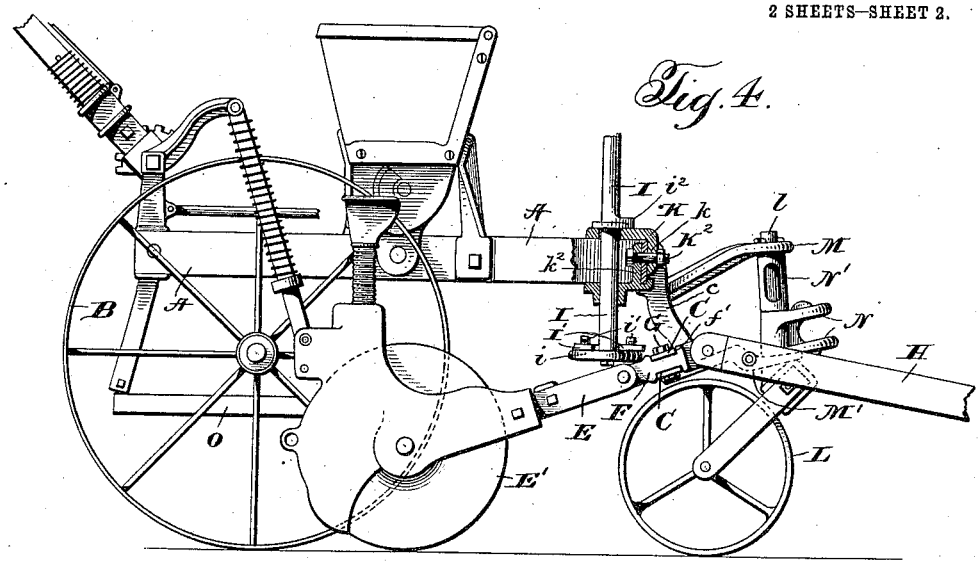

UNITED STATES PATENT OFFICE.

WILLIAM FETZER, OF MIDDLETOWN, OHIO.

GRAIN-DRILL.

1,046,755.　　　　Specification of Letters Patent.　　Patented Dec. 10, 1912.

Application filed December 1, 1908.　Serial No. 465,586.

*To all whom it may concern:*

Be it known that I, WILLIAM FETZER, citizen of the United States, residing at Middletown, in the county of Butler and State of Ohio, have invented certain new and useful Improvements in Grain-Drills, of which the following is a specification, reference being had therein to the accompanying drawing.

This invention relates to an improvement in grain drills and more particularly to the type of grain drills utilized for planting between growing rows of corn.

The present invention is an improvement upon the grain drill of this type disclosed in my Patent No. 762,813 issued June 14, 1904 and has for its object the provision of means for supporting the drill in such a manner that the weight thereof will not be borne by the horse and in such a manner that the direction of movement thereof may be readily and easily controlled.

A further object of the present invention is the provision in a drill of this type, of means for increasing and diminishing the distance between the furrow openers, so that where the rows of corn are somewhat closer together than under ordinary conditions, the furrow openers may be adjusted and the machine used without injuring the growing corn.

A further object of the invention is the provision in a device of this character of means for lessening the distance between the outermost furrow openers and simultaneously lessening the distance between the shafts, so that the width of the entire machine is lessened.

Other objects of the invention will be apparent from the detailed description hereinafter when read in connection with the accompanying drawings forming a part hereof, wherein a preferable embodiment of the invention is shown and wherein like numerals of reference refer to similar parts in the several views.

In the drawings, Figure 1 is a perspective view of my improved grain drill; Fig. 2 is a detail of one of the adjustable drag bar heads; Fig. 3 is a section on line 3—3 of Fig. 2; Fig. 4 is a partial side elevation, and Fig. 5 is a detail view of the operating mechanism for the adjustable draw bar heads.

Referring now more particularly to the drawings, A designates the frame of the machine which is supported upon carrying wheels B of any suitable construction. Suspended from the forward end of the frame A by suitable brackets $c$ are two parallel metal bars C C which extend transversely of the machine and the ends of which project laterally beyond the carrying wheels B. Rigidly clamped in any suitable manner between the metal bars C C are a plurality of drag bar heads $d$, to which are pivotally connected the forward ends of drag bars D which carry furrow openers D', which may be of any well known type. Any number of the furrow openers D' may be employed and all of such furrow openers are positioned between the carrying wheels B of the machine. In addition to the furrow openers D', there are utilized, as in the construction disclosed in my prior patent heretofore referred to two additional furrow openers E', which are positioned just outside of the carrying wheels B. The furrow openers E' are carried by drag bars E, the forward ends of which are pivotally connected to drag bar heads F, which are so secured to the frame of the machine that they may be adjusted laterally thereof, when it is desired to increase or diminish the width between the outermost furrow openers. In the preferred embodiment of the invention, the drag bar heads F are plates which fit between the metal bars C C heretofore described, the portions of said plates which lie between said bars being provided with elongated slots $f$ therein. The draw bar heads F are secured in position by means of bolts which pass through the metal bars C C and the slots $f$ in the draw bar heads, from which construction it will be apparent that while the draw bar heads are secured between the bars C C, the slots $f$ therein will permit the same to be shifted laterally of the frame of the machine. To prevent pivotal movement of the draw bar heads F about the bolts G, said heads are provided with shoulders $f'$, which are adapted to lie alongside of the edges of the metal bars C C. To permit free movement of the draw bar heads F between the bars C C, the bolts G are provided with sleeves G' which lie between the metal bars C C and in the slots $f$ formed in the draw bar heads, said sleeves being slightly greater in length than the thickness of the portions of the heads lying between the bars C C, so that when the bolts G G are secured in place, the bars C C will not be drawn into contact with the upper and lower faces of the draw bar heads. Projecting forwardly from each of the draw bar heads F are a pair of ears $f^2$ in which is pivotally supported in any suitable manner the rear end of a shaft H. The drag bar heads F are also each provided with a rearward extension at the sides of which are formed laterally disposed pintles $f^3$, which constitute the means of attachment for the drag bars E heretofore referred to. The rearward extensions of the drag bar heads F are also provided on both the upper and lower surfaces thereof with studs $f^4$ which form the means of connection for the operating instrumentalities for the draw bar heads, as will be hereinafter more particularly set forth. Only the studs upon the upper surfaces of the rearward extensions of the draw bar heads are utilized, but such studs are provided on both the upper and lower surfaces of the heads in order that the same castings may be used on both sides of the machine.

Journaled in suitable bearings secured to the front bar of the frame A of the machine intermediate the ends thereof is an upright operating shaft I, to the upper end of which is secured a suitable operating handle and to the lower end of which is fixedly secured in any suitable manner a cross piece $i$, the ends of which are provided with upwardly projecting studs $i'$. Pivotally connecting the studs $i'$ projecting upwardly from the cross piece $i$, which is secured to the lower end of the shaft I, and the studs $f^4$ which project from the upper surfaces of the rearward extensions of the draw bar heads F are links I'. From this construction, it will be apparent that by shifting the shaft I, the draw bar heads F will, through the links I' be caused to either approach or recede from each other and in consequence the distance between the furrow openers E' will be either increased or diminished. It will also be apparent that inasmuch as the shafts H are carried by the draw bar heads F they will be adjusted simultaneously therewith, so that when it is desirable to do so the width of the entire machine can be lessened to a substantial extent.

The bearing for the shaft I preferably comprises a plate K which is supported upon the upper edge of the front bar of the frame A of the machine and extends inwardly therefrom, and a plate K' which rests against the lower edge of the front bar of the frame of the machine, the plate K being provided with a downwardly extending portion $k$ which is adapted to lie against the outer surface of the front bar of the machine and the plate K' being provided with an upwardly extending portion $k^2$ which is adapted to lie against the inner surface of the front bar of the frame of the machine. The portions $k$ and $k^2$ of the plates K and K' are provided with alined apertures therein so that both of said bearing plates can be rigidly secured to the front bar of the machine by a single fastening bolt K². The inwardly extending portions of the plates K and K' are provided with alined apertures therein in which the shaft I works and said shaft is provided with a lug $i^2$ projecting therefrom which rests upon the upper surface of the inwardly extending portion of the plate K between two lugs $k^3$ formed thereon, said lugs serving to limit the movement of the shaft in its bearings.

In order to relieve the draft animal of the weight of the machine, a caster wheel L is provided for supporting the forward portion thereof. The caster wheel L is provided with the usual stem $l$ which is journaled in two brackets M and M', one of which is rigidly secured in any suitable manner to the front bar of the frame A of the machine and extends forwardly therefrom, and the other of which is rigidly secured in any desired manner to the metal bars C C and extends forwardly therefrom. Loosely mounted on the pintle $l$ of the caster wheel L intermediate the brackets M and M' is a clevis N, to which is adapted to be secured in any suitable manner the usual swingletree. Also loosely mounted on the pintle $l$ of the caster wheel L intermediate the brackets M and M' is a sleeve N', and it will be apparent that by positioning the sleeve either above or below the clevis the machine may be adapted for use in connection with either a small or large horse.

The frame A of the machine carries the usual hopper, seeding instrumentalities, and raising and lowering devices for the furrow openers, but as these parts form no part of the present invention, it is deemed unnecessary to herein describe the same. A footboard O is also preferably provided, which is suspended in any suitable manner from the rear end of the frame of the machine. It will be obvious, however, that the foot board may be dispensed with and the hopper utilized as a support for the operator, or that a separate seat for the operator may be provided.

While a preferred embodiment of the invention is illustrated in the accompanying drawings, it is obvious that many minor changes may be made to the form therein shown without departing from the spirit of the invention.

I claim:

1. In a grain drill, a frame, supporting wheels at the sides of said frame, a draw bar depending from the front portion of the frame and extending transversely thereof, a plurality of furrow openers secured to said draw bar, brackets secured to the forward portion of the frame and the draw bar, and a caster wheel journaled in said brackets.

2. In a grain drill, a frame, supporting wheels at the sides of said frame, a draw bar depending from the front portion of the frame and extending transversely thereof, a plurality of furrow openers secured to said draw bar, brackets secured to the forward portion of the frame and the draw bar, a caster wheel having its stem journaled in said brackets, and a hitch connection loosely mounted on the stem of the caster wheel.

3. In a grain drill, a frame, supporting wheels at the sides of said frame, a draw bar depending from the front portion of the frame and extending transversely thereof, a plurality of furrow openers secured to said draw bar, brackets secured to the forward portion of the frame and the draw bar, a caster wheel having its stem journaled in said brackets, a hitch connection loosely mounted on the stem of the caster wheel, and a sleeve also loosely mounted on the stem of the caster wheel.

4. In a grain drill, a frame, supporting wheels therefor, a draw bar depending from the forward portion of the frame and extending transversely thereof, a plurality of furrow openers connected to said draw bar, a pair of shafts pivoted to the draw bar adjacent the ends thereof, and a caster wheel positioned between said shafts for supporting the front end of the frame.

5. In a grain drill, a frame, supporting wheels therefor, a draw bar depending from the forward portion of the frame and extending transversely thereof, a plurality of furrow openers connected to said draw bar, a pair of laterally adjustable shaft brackets carried by the draw bar, and shafts pivotally connected to said brackets.

6. In a one horse riding grain drill, a frame, supporting means therefor, a support for the operator carried by the frame, a plurality of furrow openers carried by the frame, the outermost pair of said furrow openers being positioned outside of the supporting wheels, a pair of laterally adjustable shaft brackets secured to the forward portion of the frame, a pair of independent shafts pivoted to said brackets, and means accessible from the operator's support for adjusting the outermost furrow openers laterally to vary the width of the entire machine.

7. In a grain drill, a frame, supporting wheels therefor, a plurality of furrow openers carried by the frame, a pair of shafts connected to the front end of the frame, and means for simultaneously adjusting the outermost furrow openers and the shafts to vary the distance therebetween.

8. In a grain drill, a frame, supporting wheels therefor, a pair of laterally adjustable furrow openers positioned outside of the supporting wheels, a pair of shafts connected to the front end of the frame, and a single means for adjusting the furrow openers and shafts to vary the distance therebetween.

9. In a grain drill, a frame, supporting wheels therefor, a pair of laterally adjustable drag bar heads carried by the forward portion of the frame, a pair of drag bars pivoted to said heads and extending rearwardly therefrom, a pair of shafts pivotally connected to said heads and extending forwardly therefrom, and means for adjusting said heads to increase or diminish the distance therebetween.

10. In a grain drill, a frame, supporting wheels therefor, a pair of laterally adjustable drag bar heads carried by the forward portion of the frame, a pair of drag bars pivoted to said heads and extending rearwardly therefrom, a pair of shafts having their rear ends pivoted to said heads, and means for adjusting said heads to increase or diminish the distance therebetween.

11. In a grain drill, a frame, supporting wheels therefor, a pair of laterally adjustable drag bar heads supported in the front of said frame, a pair of drag bars pivoted to said heads and extending rearwardly therefrom, furrow openers carried by said drag bars and positioned outside of the supporting wheels, a pair of shafts having their rear ends pivoted to said heads, and means for adjusting said heads to increase or diminish the distance therebetween.

12. In a grain drill, a frame, supporting wheels therefor, a pair of laterally adjustable drag bar heads supported in the front of said frame, a pair of drag bars pivoted to said heads and extending rearwardly therefrom, furrow openers carried by said drag bars and positioned outside of the supporting wheels, a pair of shafts having their rear ends connected to said heads, and lever mechanism on the frame for simultaneously adjusting said heads to vary the distance therebetween.

13. In a grain drill, a frame, supporting wheels at the sides thereof, a draw bar depending from the forward portion of said frame and extending transversely thereof, a caster wheel for supporting the front end of the frame a pair of laterally adjustable drag bar heads carried by the draw bar, a pair of furrow openers positioned outside of the supporting wheels and pivoted to said drag bar heads, a pair of shafts connected to said drag bar heads, and means for adjusting the drag bar heads to vary the distance therebetween.

14. In a grain drill, a frame, supporting wheels therefor a draw bar depending from the forward portion of said frame and extending transversely thereof said draw bar comprising spaced bars, a pair of drag bar heads slidably secured between the spaced bars of the draw bar, a pair of drag bars pivoted to said drag bar heads, furrow openers carried by said drag bars and positioned outside of the supporting wheels, a pair of shafts having their rear ends connected to said drag bar heads, an operating shaft supported in the frame between the drag bar heads, a cross piece carried by said shaft, and links connecting the ends of the said cross piece and said drag bar heads.

15. In a grain drill, a frame, a draw bar extending transversely of the forward portion of the frame comprising spaced bars, a pair of drag bars having their forward ends slidably secured between the said space bars, and lever means for shifting the ends of said drag bars between said spaced bars and holding the same in various positions of adjustment.

16. In a grain drill, a frame, supporting wheels at the sides of said frame, a caster wheel for the forward portion of the frame, a draw bar extending transversely of the frame, furrow openers lying outside of said carrying wheels and having their forward ends pivotally connected to said draw bar, laterally adjustable shaft brackets secured to the draw bar, and means for adjusting said brackets.

17. In a grain drill, a frame, supporting wheels at the sides thereof, a draw bar extending transversely thereof, drag bars connected to said draw bar, and a caster wheel supported jointly from the frame and draw bar.

WILLIAM FETZER.

Witnesses:
H. B. KRAUSS,
GROVER C. BUEHL.

---

Copies of this patent may be obtained for five cents each, by addressing the "Commissioner of Patents, Washington, D. C."